US010968089B2

(12) United States Patent
Bhatia et al.

(10) Patent No.: US 10,968,089 B2
(45) Date of Patent: Apr. 6, 2021

(54) PLATFORM CONTROL BOX

(71) Applicant: Oshkosh Corporation, Oshkosh, WI (US)

(72) Inventors: Shashank Bhatia, Oshkosh, WI (US); Aaron Powers, Oshkosh, WI (US); Michael W. Stouffer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/811,701

(22) Filed: Mar. 6, 2020

(65) Prior Publication Data

US 2020/0317489 A1 Oct. 8, 2020

Related U.S. Application Data

(60) Provisional application No. 62/829,924, filed on Apr. 5, 2019.

(51) Int. Cl.
*B66F 11/04* (2006.01)
*G06F 3/041* (2006.01)
*B66F 13/00* (2006.01)

(52) U.S. Cl.
CPC ............ *B66F 11/042* (2013.01); *B66F 13/00* (2013.01); *G06F 3/0412* (2013.01); *G06F 3/04164* (2019.05)

(58) Field of Classification Search
CPC ........ B66F 11/04; B66F 11/042; B66F 11/046
See application file for complete search history.

(56) References Cited

U.S. PATENT DOCUMENTS 2,997,721 A * 8/1961 Hopfeld .................. B66F 11/04
4/626
9,079,756 B2 * 7/2015 Beji ...................... B66F 17/006
(Continued)

FOREIGN PATENT DOCUMENTS

EP 2 869 234 A1 5/2015
GB 2 553 137 A 2/2018
(Continued)

OTHER PUBLICATIONS

International Search Report and Written Opinion for International Application No. PCT/US2020/021470 dated Jun. 29, 2020, 24 pages.

*Primary Examiner* — Alvin C Chin-Shue
(74) *Attorney, Agent, or Firm* — Foley & Lardner LLP

(57) ABSTRACT

Systems and apparatuses include a control box for a movable work platform. The control box includes a housing and a display supported by the housing. The housing is defined by a first side panel and a second side partially surrounding and extending from a lower enclosure to an upper enclosure spaced apart from the lower enclosure. At least one of the upper enclosure and the lower enclosure supports a control panel having a plurality of inputs. At least one of the inputs is a platform positioning mechanism in communication with a lift system configured to move the work platform vertically between a stowed position and a deployed position. The display is supported by the housing and is in communication with at least one of the plurality of inputs. The display is configured to receive and present output obtained by a sensor monitoring a parameter of the work platform.

10 Claims, 14 Drawing Sheets

(56) References Cited

U.S. PATENT DOCUMENTS

| | | | |
|---|---|---|---|
| 9,387,985 B2 | 7/2016 | Gillmore et al. | |
| 9,694,671 B2 | 7/2017 | Wildgrube et al. | |
| 9,776,846 B2 | 10/2017 | Ditty | |
| 9,791,071 B2 | 10/2017 | Ditty et al. | |
| 9,845,191 B2 | 12/2017 | Schwartz et al. | |
| 10,174,868 B2 | 1/2019 | Ditty et al. | |
| 10,336,596 B2 | 7/2019 | Puszkiewicz et al. | |
| 10,357,995 B2 | 7/2019 | Palmer et al. | |
| 10,472,889 B1 | 11/2019 | Betz | |
| 10,479,664 B2 | 11/2019 | Linsmeier et al. | |
| 10,611,347 B1 | 4/2020 | Archer et al. | |
| 10,617,900 B1 | 4/2020 | Linsmeier et al. | |
| 2009/0267037 A1* | 10/2009 | Johnson | H02G 1/02 254/134.3 PA |
| 2011/0060488 A1* | 3/2011 | Nakazawa | B66F 9/20 701/22 |
| 2012/0217091 A1* | 8/2012 | Baillargeon | B66F 11/04 182/18 |
| 2015/0027808 A1 | 1/2015 | Baillargeon et al. | |
| 2016/0099122 A1 | 4/2016 | Cummings et al. | |
| 2017/0211765 A1* | 7/2017 | Walker | F21S 9/03 |
| 2019/0137006 A1 | 5/2019 | Ditty et al. | |
| 2019/0177140 A1* | 6/2019 | Gilbride | B66F 11/044 |
| 2019/0322512 A1 | 10/2019 | Puszkiewicz et al. | |
| 2019/0359460 A1 | 11/2019 | Linsmeier et al. | |
| 2020/0071996 A1 | 3/2020 | Betz | |
| 2020/0140248 A1 | 5/2020 | Hackenberg et al. | |
| 2020/0140249 A1 | 5/2020 | Hackenberg et al. | |
| 2020/0238115 A1* | 7/2020 | Linsmeier | B66F 11/046 |

FOREIGN PATENT DOCUMENTS

| | | |
|---|---|---|
| KR | 100714730 B1 | 5/2007 |
| WO | WO-2018/160940 A1 | 9/2018 |

\* cited by examiner

MAINTENANCE

MAINTENANCE INTERVALS ○
MAINTENANCE LOG
LUBRICATION CHART
DOWNLOAD

CURRENT ENGINE HOURS   1637
HOURS SINCE LAST MAINTENANCE   311

FIG. 13

PLATFORM CONTROL BOX

CROSS-REFERENCE TO RELATED APPLICATIONS

This application claims priority to U.S. Provisional Patent Application Ser. No. 62/829,924, filed Apr. 5, 2019, the content of which is hereby incorporated by reference in its entirety.

BACKGROUND

Booms and lifts typically include a platform capable of supporting one or more workers at different elevations. The platform can be moved vertically and/or horizontally to position a worker in a desired location that allows the worker to perform a task.

SUMMARY

One exemplary embodiment relates to a control box for a work platform. The control box includes a housing and a display. The housing is defined by a first side panel and a second side panel opposing the first side panel. The first side panel and the second side panel partially surround and extend from a lower enclosure to an upper enclosure spaced apart from the lower enclosure. At least one of the upper enclosure and the lower enclosure support a control panel having a plurality of inputs. At least one of the inputs is a platform positioning mechanism in communication with a lift system that is configured to move the work platform vertically between a stowed position and a deployed position. The display is supported by the housing and is in communication with at least one of the plurality of inputs. The display is configured to receive and present output obtained by a sensor monitoring a parameter of the work platform. The sensor is one of a platform load measuring sensor, a platform tilt measuring sensor, and a platform elevation sensor.

Another exemplary embodiment relates to a lift. The lift includes a work platform having a platform surface at least partially surrounded by a guard railing. A motor supplies rotational power to a plurality of wheels coupled to a base. A lift system is coupled to the work platform and is adjustable to move the work platform between a stowed position proximate the base and a deployed position away from the base. A control box is mounted to the guard railing and extends inward from a perimeter of the guard railing. The control box includes a housing and a display. The housing is defined by a first side panel and a second side panel opposing the first side panel. The first side panel and the second side panel partially surround and extend from a lower enclosure to an upper enclosure spaced apart from the lower enclosure. At least one of the upper enclosure and the lower enclosure support a control panel having a plurality of inputs. At least one of the inputs is a platform positioning mechanism in communication with a lift system that is configured to move the work platform vertically between a stowed position and a deployed position. The display is supported by the housing and is in communication with at least one of the plurality of inputs. The display is configured to present a graphical user interface configured to display data obtained by a sensor. The sensor is at least one of a platform load measuring sensor, a platform tilt measuring sensor, and a platform elevation sensor.

Another exemplary embodiment relates to a scissor lift. The scissor lift includes a work platform, a motor, a lift system, and a control box. The work platform has a platform surface at least partially surrounded by a guard railing. The motor supplies rotational power to a plurality of wheels coupled to a base. The lift system is coupled to the work platform and is adjustable to move the work platform between a stowed position proximate the base and a deployed position away from the base. The lift system includes a hydraulic cylinder and a series of foldable links. The control box includes a display and is coupled to the guard railing. The control box extends inward from a perimeter of the guard railing. The housing is defined by a first side panel and a second side panel opposing the first side panel. The first side panel and the second side panel partially surround and extend from a lower enclosure to an upper enclosure spaced apart from the lower enclosure. The lower enclosure supports a first control panel having a first plurality of inputs and a joystick extending upward from the lower enclosure. The joystick is configured to communicate commands to each of the motor, the lift system, and a steering system coupled to the wheels to adjust operational parameters thereof. The upper enclosure has a second control panel in communication with the first control panel that supports a second plurality of inputs. The second plurality of inputs are in communication with the display. A battery positioned within the lower enclosure provides electrical power to each of the first control panel, the second control panel, and the display. The display is configured to present a graphical user interface configured to display data obtained by a sensor. The sensor is at least one of a platform load measuring sensor, a platform tilt measuring sensor, and a platform elevation sensor.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 13 is a pictorial view of a maintenance screen on the user interface that can be presented on the display of the control boxes of FIGS. 4A and 5;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for operating, monitoring, and controlling a work platform using a control box. The control box has a housing that supports a panel display that readily presents information in a graphical user interface (GUI), including output received from sensors monitoring various operational parameters of a lift system and a lift, more generally. A user can interact with the GUI to execute a wide variety of different functions, including adjusting a position of the platform (e.g., vertically or horizontally), leveling a base of the lift, entering maintenance activities, reviewing past maintenance logs, presenting maintenance instructions, verifying proper safety protocols have been followed, and performing diagnostic tests on vehicle systems. The control box further includes a platform positioning system (e.g., a joystick) that can be used to adjust a horizontal and/or vertical position of the work platform. The control box can be mounted to the work platform so that a single worker can conveniently control and monitor the work platform while actively performing tasks on the work platform.

Figure 1:
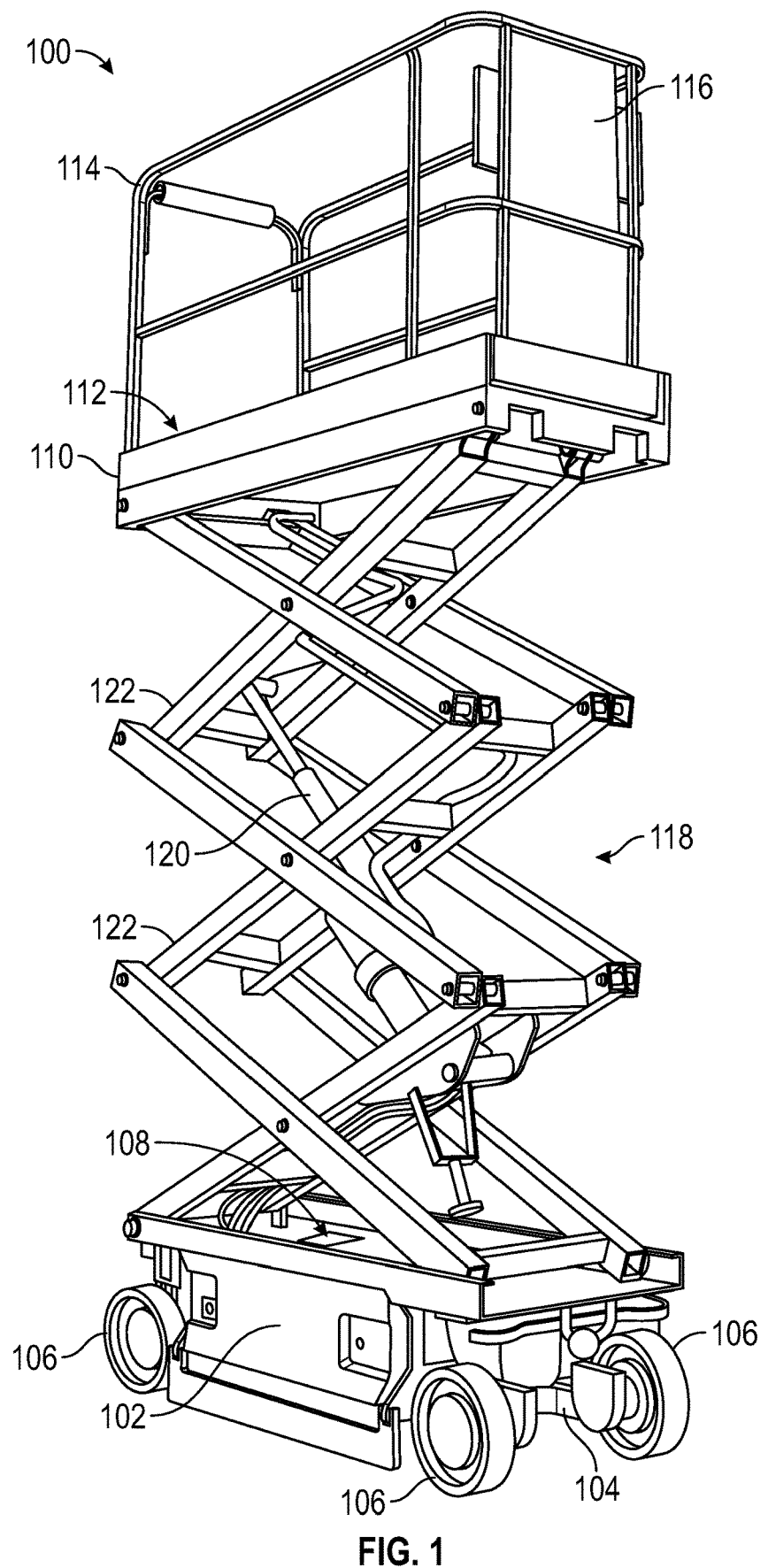
FIG. 1 is a perspective view of a scissor lift, according to an exemplary embodiment.
Figure 2:
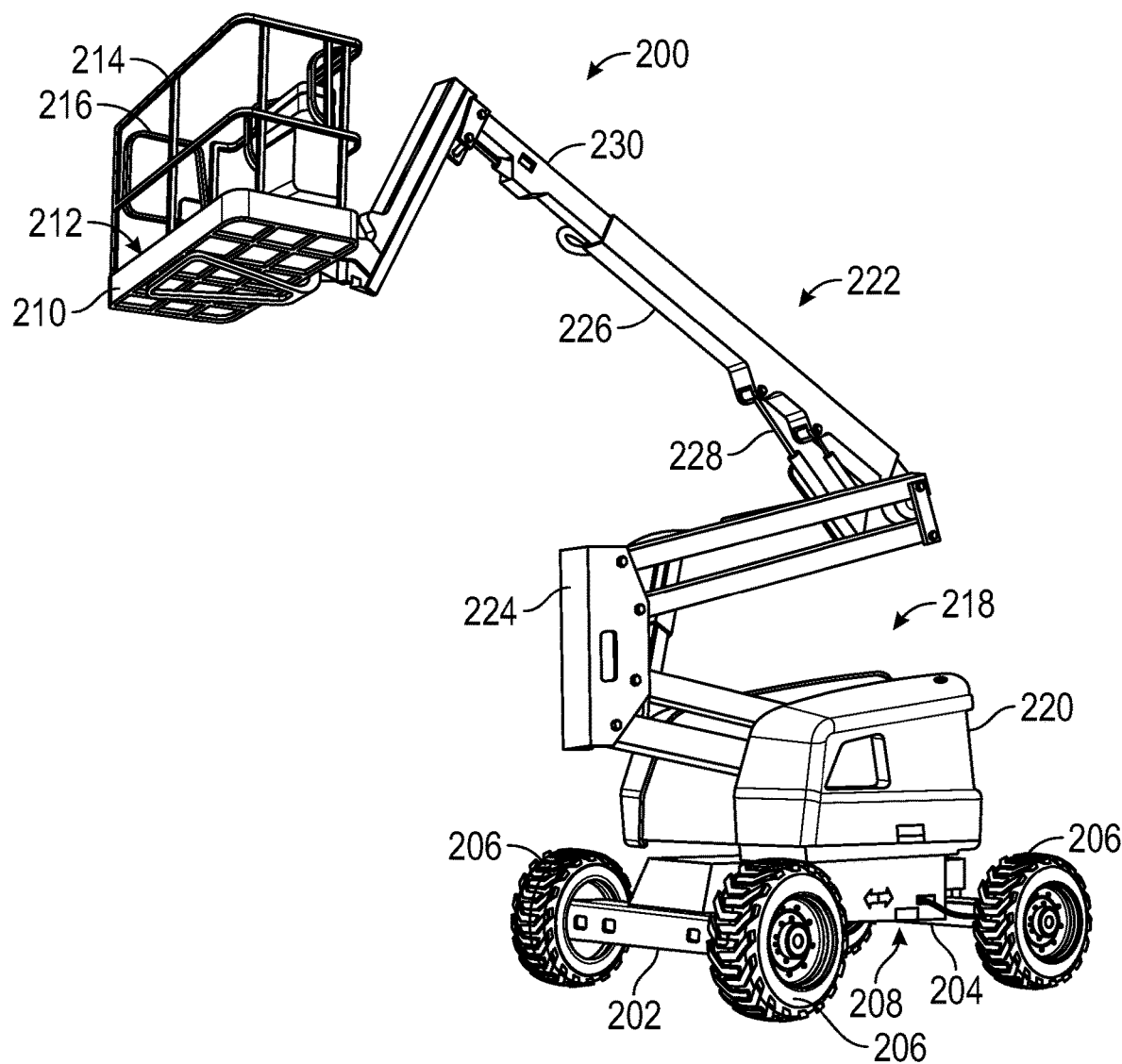
FIG. 2 is a perspective view of a boom lift, according to another exemplary embodiment.

Referring to FIGS. 1 and 2, a scissor lift 100 and boom lift 200 are depicted. Each of the scissor lift 100 and boom lift 200 are designed to help a worker perform tasks at different heights and positions relative to the ground below. The scissor lift 100 and boom lift 200 have several common components that operate in similar manners. Each lift 100, 200 has a base 102, 202 supporting a vehicle chassis 104, 204 and a plurality of wheels 106, 206. The wheels 106, 206 can be supplied with rotational power from a motor 108, 208 supported by the base 102, 202. The motor 108, 208 can be a combustion engine, for example, which runs on gasoline or another suitable fuel source (e.g., compressed natural gas). Alternatively, the motor 108, 208 can be an electric motor (e.g., an induction motor, brushed or brushless DC motor) or hybrid motor that operates using an onboard battery (not shown). The onboard battery can be a rechargeable lithium-ion battery, for example.

Figure 3:
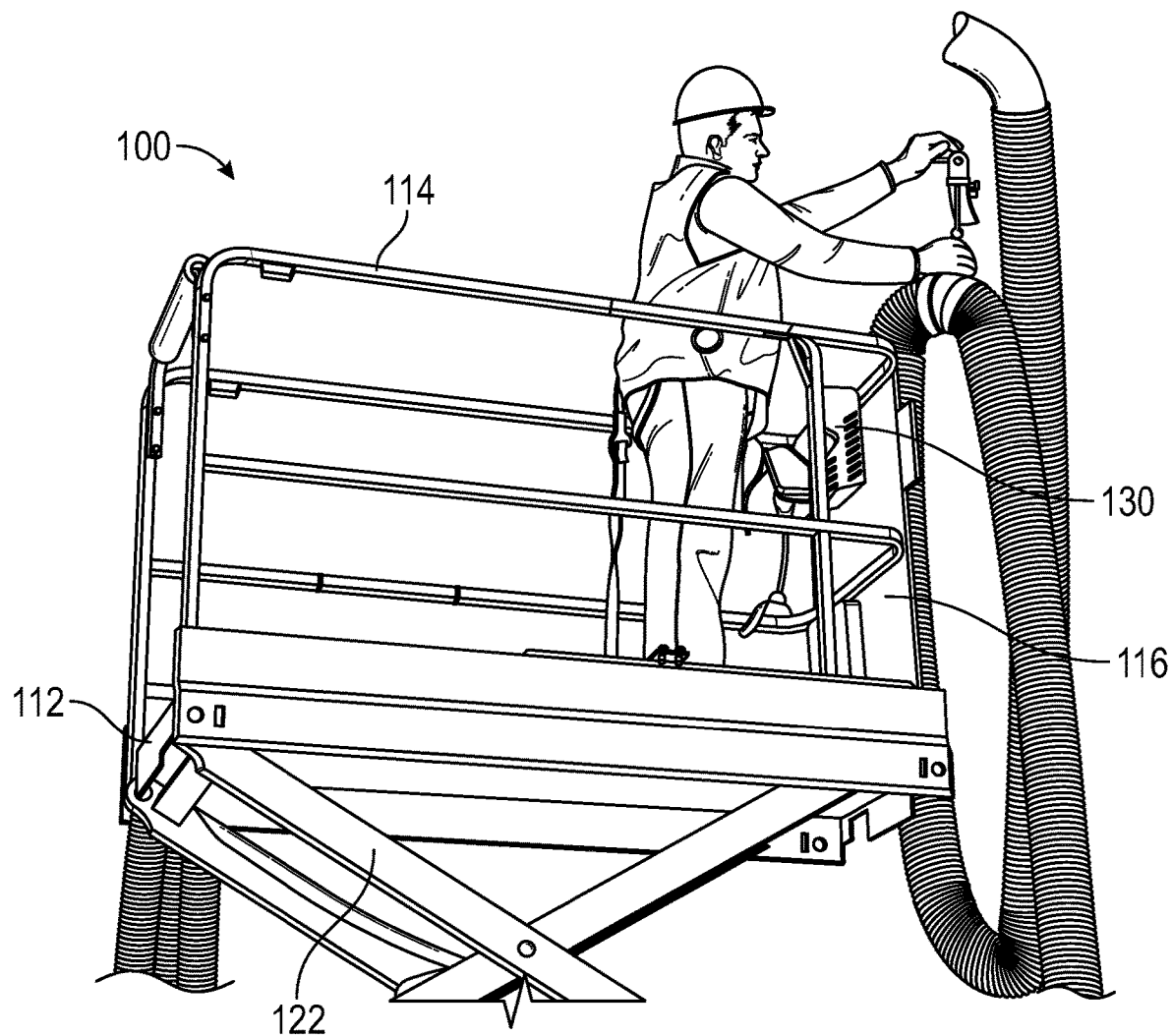
FIG. 3 is a perspective view of a work platform on the scissor lift of FIG. 1.

The scissor lift 100 and boom lift 200 each have a movable work platform 110, 210, shown in additional detail in FIG. 3. Each work platform 110, 210 has a generally flat platform surface 112, 212 at least partially surrounded by guard railing 114, 214. The guard railing 114, 214 provides a barrier around the platform surface 112, 212 to help protect a worker on the work platform 110, 210. Additionally, the guard railing 114, 214 can provide several possible safety clip or harness attachment locations for workers on the work platform 110, 210. In some embodiments, the guard railing 114, 214 includes a gate 116, 216 that selectively permits access onto the work platform 110, 210. The gate 116, 216 can be movably coupled (e.g., rotatably coupled or slidably coupled) to a portion of the guard railing 114, 214 between an "open" position permitting access into the work platform 110, 210 and a "closed" position prohibiting access onto the work platform 110, 210. A lock (not shown) can be incorporated into the gate 116, 216 and guard rail 114, 214 assembly that automatically locks the gate 116, 216 in the closed position whenever the work platform 110, 210 is elevated. Alternatively, the lifts 100, 200 can each be configured so that the platform 110, 210 cannot be elevated unless the gate lock is in a locked position.

The work platform 110, 210 is coupled to a lift system 118, 218 that can adjust the position of the work platform 110, 210. For example, the scissor lift 100 can include a hydraulic cylinder 120 (or electric linear actuator) and a series of crisscrossing, foldable support links 122 movable between a stowed position (not shown) and a deployed position, as shown in FIG. 1. Each foldable support link 122 is rotatably coupled to another foldable support link 122 in the lift system 118 so that extension (or retraction) of a piston of the hydraulic cylinder 120 causes each support link 122 to unfold (or fold) simultaneously. The folding and unfolding of support links 122 raises or lowers the work platform 110 positioned atop the support links 122. In the stowed position, the work platform 110 is positioned proximate the base 102. With the work platform 110 positioned proximate the base 102, a worker may be able to access the work platform 110 (e.g., step onto the platform surface 112) from the ground below the lift 100. Once on the work platform 110, the worker can activate the lift system 118 to raise the foldable support links 122 and work platform 110 away from the base 102 to a desired working height, where a task can be performed by the worker.

The lift system 218 on the boom lift 200 can move the work platform 210 vertically, as well as horizontally. A counterweight housing 220 is swivel-connected to the base 202 of the boom lift 200, and can rotate angularly relative to the base 202. The work platform 210 and boom assembly 222 are coupled to the counterweight housing 220 and rotate in unison with the counterweight housing 220. The boom assembly 222 includes a boom riser 224 coupled to and extending outward from the counterweight housing 220. A boom mast 226 is rotatably coupled to and supported by the boom riser 224. A hydraulic cylinder 228 (or electric linear actuator) is positioned between the boom riser 224 and the boom mast 226 to rotate the boom mast 226 outwardly away from the boom riser 224, which in turn raises the work platform 210. A telescoping arm 230 can be received within and supported by the boom mast 226. The telescoping arm 230 supports the work platform 210 and can slide relative to the boom mast 226 in response to a second hydraulic cylinder or linear actuator (not shown) to extend the work platform 210 away from or retract the work platform 210 toward the base 202.

In the stowed position (not shown), the telescoping arm 230 is retracted within the boom mast 226 and the boom mast 226 sits upon the boom riser 224. The work platform 210 can be positioned upon or just off of the ground below the boom lift 200, forward from the base 202, so that a worker can readily access the work platform 210 from the ground. The position of the work platform 210 can be adjusted away from the stowed position to one of many deployed positions by rotating the counterweight housing 220, rotating the boom mast 226 relative to the boom riser 224, extending or retracting the telescoping arm 230 from the boom mast, or any combination of these movements.

The position of the work platform 110, 210 can be adjusted by a worker present on the work platform 110, 210 using a control box 130. As depicted in FIG. 3, the control box 130 can be positioned within the platform 110, 210 proximate one of the guard rails 114, 214 or gates 116, 216. In some examples, the control box 130 is mounted to the guard rails 114, 214, and extends inward, from a perimeter of the guard rails 114, 214 into the area above the work platform 110, 210. The control box 130 communicates with various systems on the lift 100, 200, including the lift system 118, 218, which controls the position the work platform 110, 210.

In addition to controlling the lift system 118, 218, the control box 130 acts as a command center for a worker on the platform 110, 210 that provides valuable information to a worker while promoting efficient and effective lift 100, 200 usage. The control box 130 can be placed in communication with various systems on the lift 100, 200, including the motor 108, 208, the chassis 104, 204 (e.g., the steering system), the battery or fuel source, the lift system 118, 218, sensors placed about the lift 100, 200, as well as external sources including a network, an external computing system, Wi-Fi, or cloud-based memory. A worker on the platform 110, 210 can readily interact with and view the control box 130 to perform a variety of lift-based tasks as well as routine lift 100, 200 maintenance.

Figure 4A:
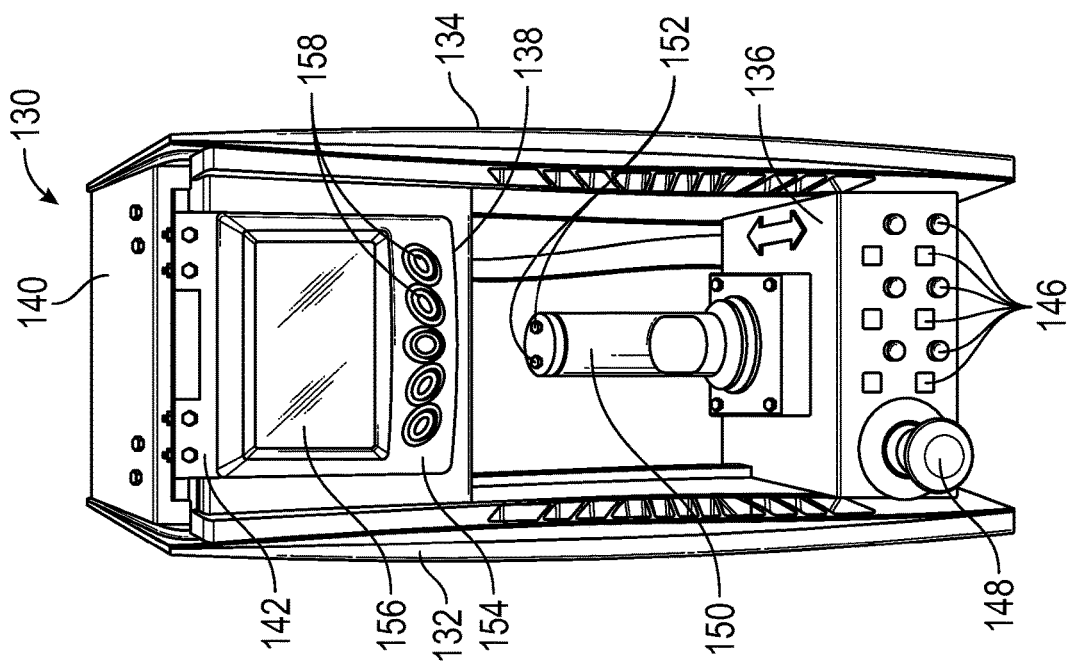
FIG. 4A is a perspective view of a control box on either of the scissor lift of FIG. 1 or the boom lift of FIG. 2, shown in isolation.
Figure 4B:
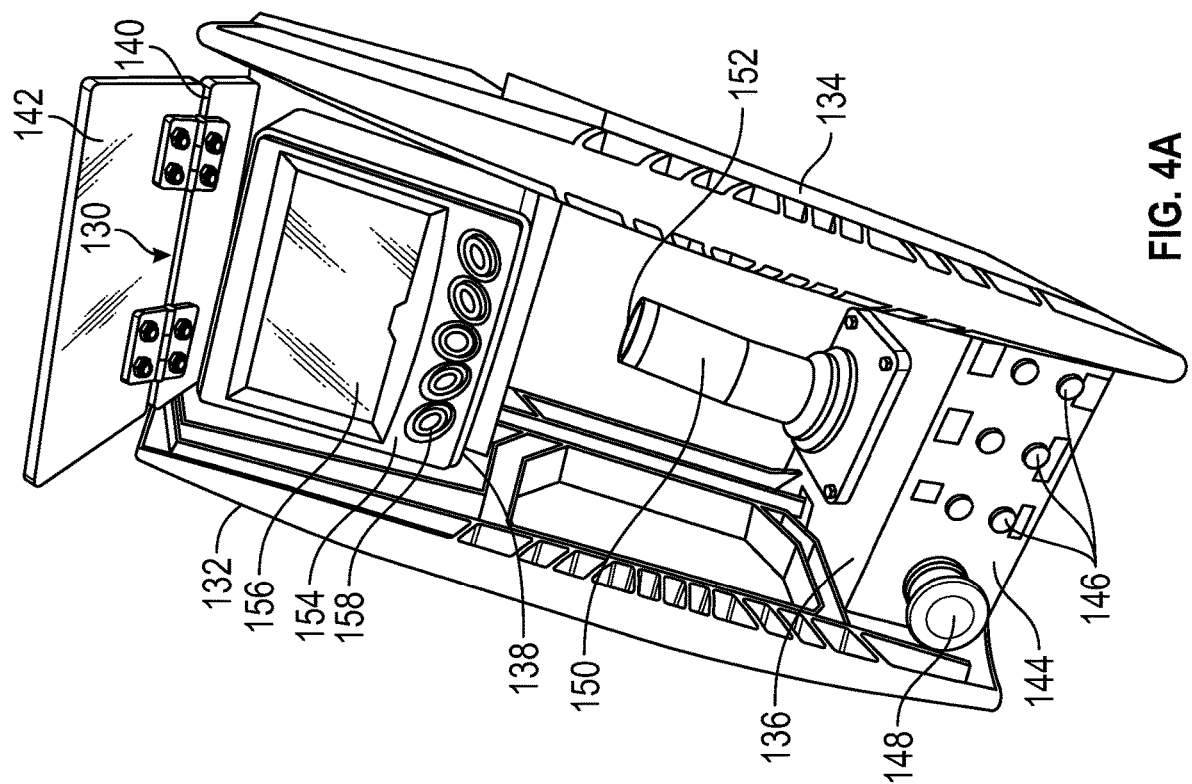
FIG. 4B is another perspective view of the control box of FIG. 4A.

FIGS. 4A-4B depict the control box 130 in additional detail. The control box 130 includes a housing formed of two opposing side panels 132, 134 that partially surround and support a lower enclosure 136 and an upper enclosure 138 spaced apart from the lower enclosure. The side panels 132, 134 can each have a uniform shape formed from a polymer-based material. In some embodiments, the side panels 132, 134 are formed of a high strength fiberglass reinforced resin. The lower and upper enclosures 136, 138 of the housing can be formed from extruded aluminum or other suitable lightweight materials. In some embodiments, the side panels 132, 134 are coupled together by a roof 140 that extends between the two side panels 132, 134. A protective cover 142 is rotatably coupled to the roof 140 and suspended downward from the roof 140, forward of a display 156. The protective cover 142 can be formed of a UV and scratch resistant polycarbonate, for example, to prevent damage to the upper enclosure 138.

The upper and lower enclosures 136, 138 can each support and contain interactive electronics that can be readily manipulated by a worker on the platform 110, 210 to effect different vehicle functions or display different vehicle characteristics. For example, the lower enclosure 136 can support a first control panel 144 displaying several selectable inputs 146. The inputs 146 can vary in purpose. For example, one of the inputs 146 can be a boom 100, 200 ignition switch. Toggling the boom ignition switch can issue a command to the battery to provide power to the motor 108, 208, and in turn, the lift system 118, 218, so that the platform 110, 210 can be moved. To avoid using battery power from the main battery when the boom 100, 200 is not running for extended periods of time, a secondary battery (not shown) can be positioned within the lower enclosure 136 to power the first control panel 144 and ensure that the ignition switch will still function. In some examples, the secondary battery can supply power to a spark plug to help initiate combustion within the motor 108, 208 if the main battery has malfunctioned or is depleted. Accordingly, the secondary battery can be used to execute a backup ignition sequence. Another input can be used to control a horn (not shown) on the boom 100, 200.

The selectable inputs 146 on the first control panel 144 can also be used to position the work platform 110, 210. For example, two inputs 146 on the first control panel 144 can be provided to communicate with the motor 108, 208 to move the base 102, 202 of the lift 100, 200. Both a forward, or "drive" button as well as a backward, or "reverse" button can be present on the control panel 144. Pushing either of these inputs can send a signal to the motor 108, 208, which in turn transmits rotational power to the wheels 106, 206 to move the base 102, 202 of the lift 100, 200 and horizontal the position of the work platform 110, 210. The inputs 146 can also be placed in communication with the lift system 118, 218 to adjust or control the position of the work platform 110, 210. For example, the array of inputs 146 can include both an "up" and a "down" button to control the lift system 118, 218 and vertical position of the work platform 110, 210. Each input 146 can be labeled according to its function.

System overrides may also be incorporated into the control panel 144. For example, an emergency stop button 148 can be positioned on one end of the first control panel 144. The large emergency stop button 148 can be provided with a distinct, larger shape and different color than the other inputs 146 so that a worker can readily identify the location of the stop button 148. The emergency stop button 148 can be used to discontinue power supply from the battery to the motor 108, 208, and can be used to slowly transition the lift system 118, 218 to move the work platform 110, 210 downward, toward the stowed position.

In addition to the inputs 146 and the emergency stop button 148, the lower enclosure 136 can support a platform positioning mechanism. The platform positioning mechanism can include a joystick 150 or a steering wheel, for example, which can be used to perform more advanced driving maneuvers with the lift 100, 200. In some embodiments, the platform positioning mechanism is adapted to communicate with and issue control commands to one or more of the motor 108, 208, the chassis 104, 204 (i.e., to a steering system supported by the chassis), and the lift system 118, 218 simultaneously. The joystick 150 extends away from a top surface of the lower enclosure 136, and is pivotable relative to the lower enclosure 136. The orientation of the joystick 150 relative to the lower enclosure 136 can be provided to a processor, which then issues commands to one or more of the motor 108, 208, chassis 104, 204, and lift system 118, 218 to adjust operational parameters of the lift 100, 200. For example, moving the joystick 150 forward and to the right will issue commands that urge the motor 108, 208 to drive the vehicle forward, while simultaneously issuing a command to the vehicle chassis 104, 204 to adjust the orientation of the wheels 106, 206 right. The lift 100, 200 then travels in the direction inputted. In some embodiments, the joystick 150 can include additional inputs 152 to control the lift system 118, 218. For example, two separate buttons 152 can be positioned on top of the joystick 150 that can be controlled by the thumb of a user who is simultaneously driving the lift 100, 200.

In some embodiments, operation of the lift mechanism 118, 218 is disabled and overridden when the motor 108, 208 is driving the lift 100, 200 or the steering of the chassis 104, 204 is being adjusted. Similarly, when the lift mechanism 118, 218 is being used to adjust a vertical position of the work platform 110, 210, the motor 108, 208 and steering of the chassis 104, 204 can be maintained in a constant state, regardless of the orientation of the joystick 150. In some embodiments, the platform positioning mechanism 150 includes two joysticks. Because the platform 210 of the boom 200 can be adjusted both vertically and horizontally using the lifting mechanism 218 only, a first joystick may be used to rotate and elevate the work platform, while a second joystick can be used to drive and steer the base 202 of the lift 200.

The lower enclosure 136 can also support a variety of user-friendly functions. In some embodiments, the lower enclosure 136 includes one or more USB charge ports (not shown) in electrical communication with the main battery or other power source (e.g., the secondary battery within the lower enclosure 136). The USB charge ports can then supply power to various electronic equipment that may need charging upon the work platform 110, 210, including cell phones, power tools, and radios. A phone holder (not shown) can be positioned on top of the lower enclosure 136 to help secure and orient a cell phone in a readable position.

The upper enclosure 138 of the housing includes a second control panel 154 and a display 156. The display 156 can be a light emitting diode (LED) or a color liquid crystal display (LCD), for example, that is configured to present a graphical user interface (GUI). The GUI can provide valuable information to a worker to promote efficient and effective use of the lift 100, 200. The display 156 can operate at a high brightness (e.g., greater than 800 nits, or between about 900-1,000 nits) to help ensure that a worker on the platform 110, 210 can view the information presented. The display 156 can be relatively small (e.g., less than 10 inches, diagonally, or about 4.3 inches) and can be coupled to a real-time clock that includes another backup battery. The display 156 can draw electrical power from the main lift battery or from a separate battery contained within the upper enclosure 138, and can operate at a 12V or a 24V nominal operating voltage.

The second control panel can include a plurality of inputs 158 that are in communication with the display 156. For example, an array of buttons 158 can be spaced apart from one another beneath the display 156. A GUI can then display a menu of different selectable items that correspond with the location of each button 158, as explained in additional detail below. Alternatively, the display 156 can be a touch screen, such that each input 158 is presented virtually on the display 156.

Figure 5:
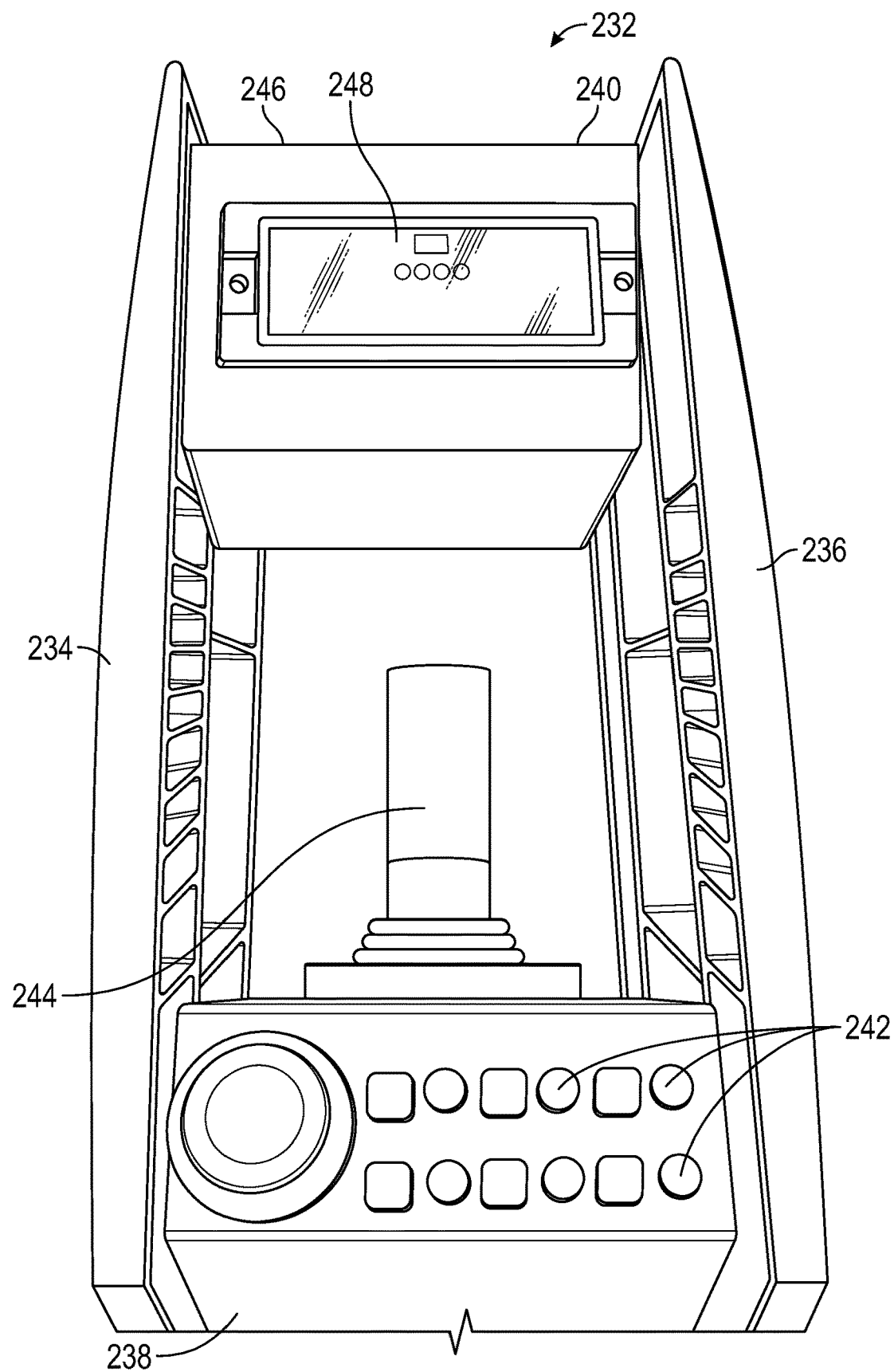
FIG. 5 is a perspective view of another control box that can be used on either of the scissor lift of FIG. 1 or the boom lift of FIG. 2, shown in isolation.
Figure 6:
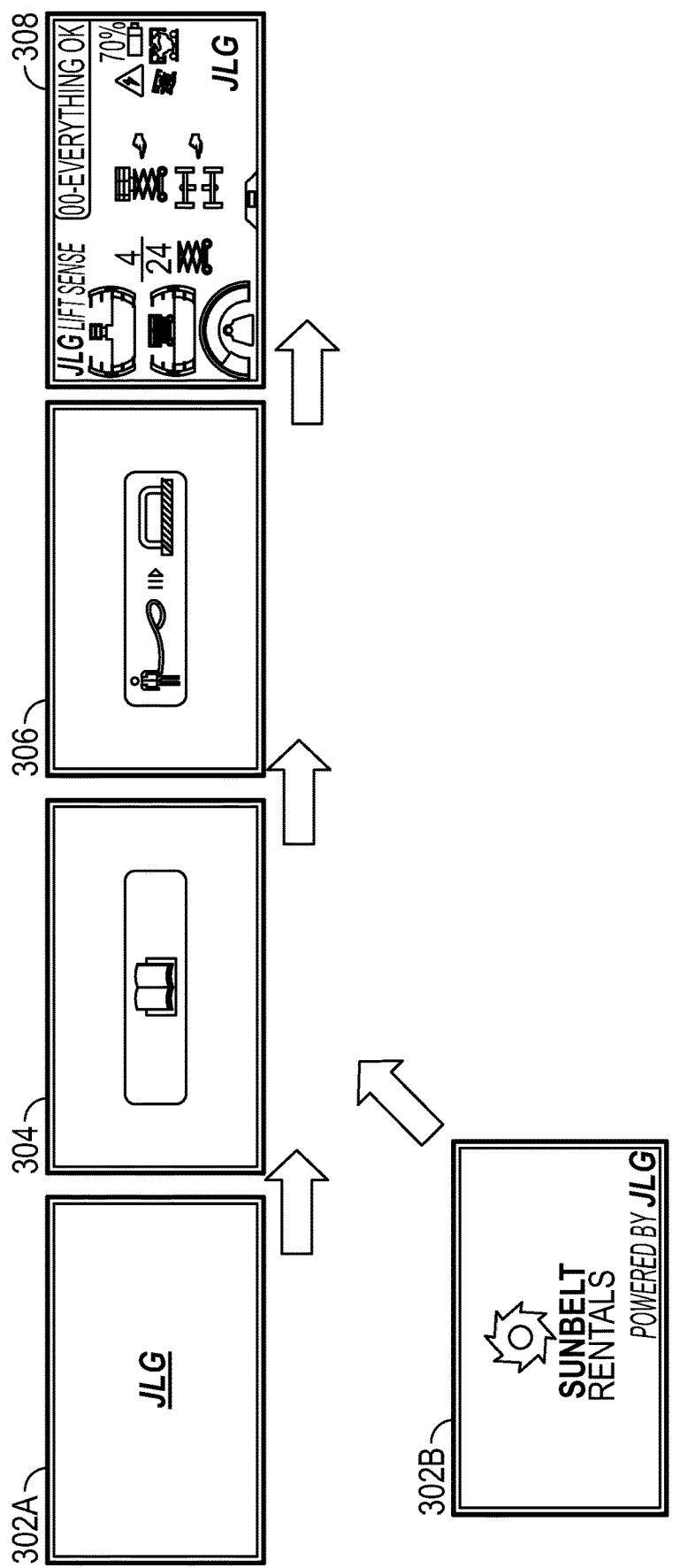
FIG. 6 is a sequential view of graphics within a user interface that can be presented on a display of the control boxes of FIGS. 4A and 5.

FIG. 5 depicts another control box 232 suitable for use in either lift 100, 200. The control box 232 has a simplified input structure and display that can still present various operational characteristics about the lift 100, 200 at a lower cost. The control box 232 once again is defined by a housing formed of two side panels 234, 236, a lower enclosure 238, and an upper enclosure 240. The lower enclosure 238 once again includes an array of inputs 242 that correspond to various lift functions 100, 200, including motor ignition, lift system actuation, and vehicle driving that can be executed by the lift 100, 200. A platform positioning mechanism 244 in the form of a joystick is once again supported by the lower enclosure 238 to provide multi-dimensional movement of the work platform 110, 210, as explained above with respect to the platform positioning mechanism 150. An upper control panel 246 can support a simplified LED display 248. The LED display 248 can include a plurality of inputs (not shown) or can serve as an indication device only.

In addition to controlling the operation of the lift 100, 200, the control boxes 130, 232 can support and present a GUI 300 on the display 156, 248, as shown in FIGS. 6-19. The GUI 300 provides information about the lift 100, 200 that can help a worker successfully and efficiently perform a task on the work platform 110, 210.

When the display 156, 248 is initially powered on (which may correspond with the ignition of the motor 108, 208 or activation of a power on switch on the control box 130, 232), a start-up screen 302A, 302B can be presented on the display 156, 248. The start-up screen 302A, 302B can provide a manufacturer's logo or a lift owner's logo, for example, depending on the business type. Displaying the owner's logo may be advantageous for lift owners running rental businesses. After a certain amount of time has elapsed, the GUI 300 can advance through a sequence of screens that may require some interaction from a worker operating the lift 100, 200. For example, screen 304 may prompt a worker to verify they have read the operational instructions associated with the lift 100, 200. Screen 306 may prompt a worker to verify that they have properly secured themselves to the work platform 110, 210 by attaching a safety harness or clip to the guard rail 114, 214. In some examples, a user must verify that they have secured themselves to the work platform 110, 210 with a safety harness or suitable restraint (e.g., by actuating one of the inputs 158) before the motor 108, 208 or lift system 118, 218 can be controlled from the work platform 110, 210. Once a worker has verified that safety protocol has been followed, the GUI 300 can advance to the home screen 308, which displays various operational parameters of the lift 100, 200.

Figure 7:
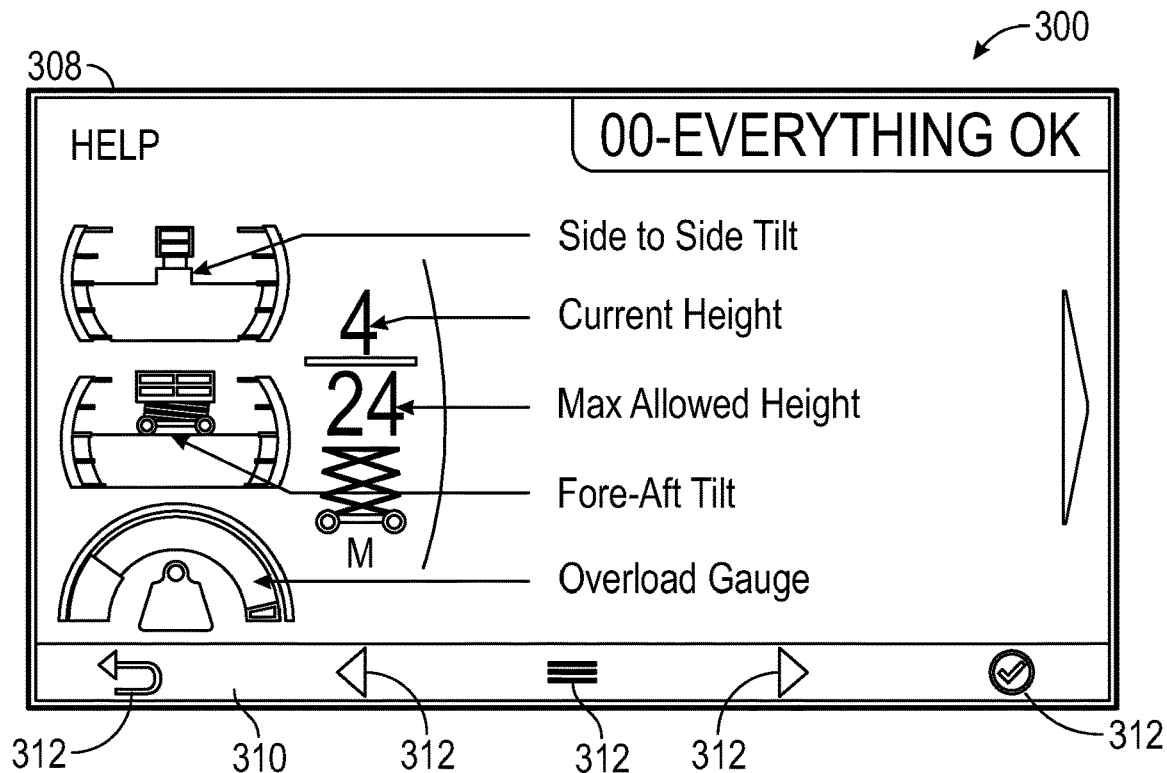
FIG. 7 is a pictorial view of a home screen from the sequential view of graphics in FIG. 6, detailing visual indicators that can be presented on the display of the control boxes of FIGS. 4A and 5.
Figure 8:
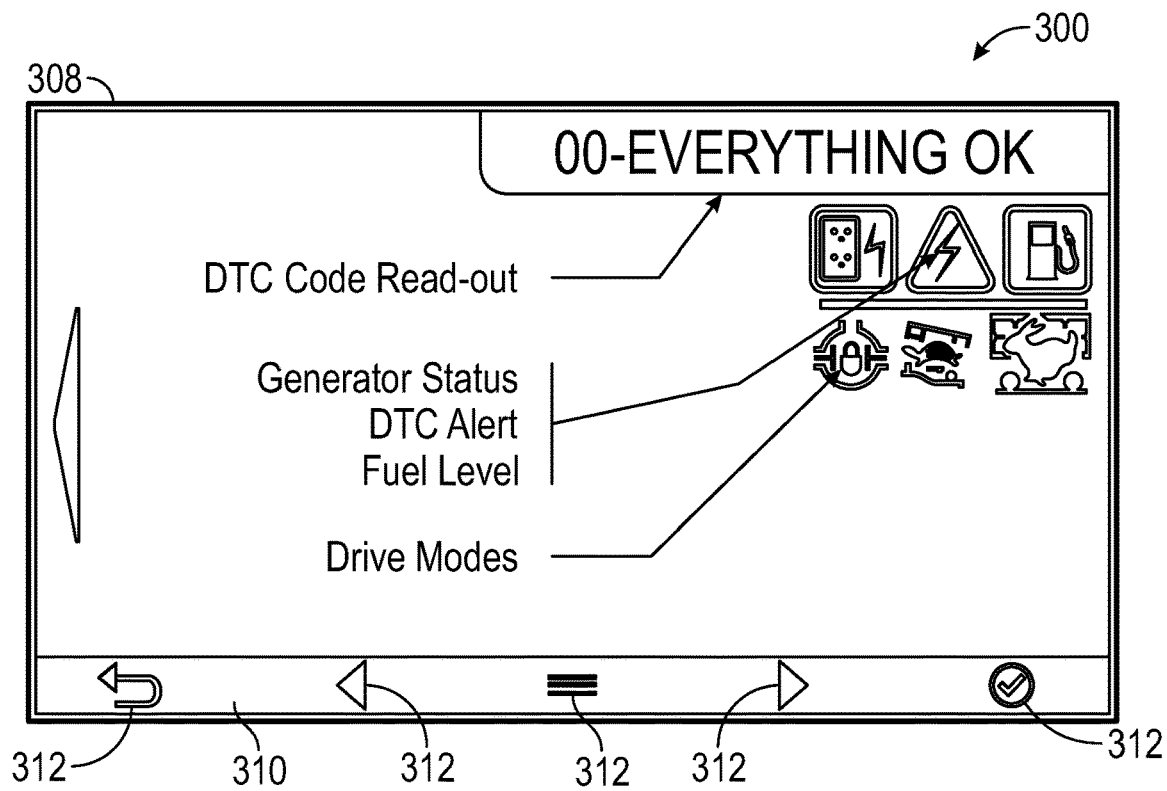
FIG. 8 is a pictorial view of a home screen from the sequential view of graphics in FIG. 6, detailing additional visual indicators that can be presented on the display of the control boxes of FIGS. 4A and 5.

FIGS. 7-8 illustrate each visual indicator present on the home screen 308. The display 156, 248 can visualize and present current side-to-side tilt of the lift 100, 200, fore-aft tilt of the lift 100, 200, a load capacity of the lift 100, 200, and a current and maximum allowable height of the lift 100, 200. The display 156, 248 can update each quantity in real time using output obtained from a plurality of sensors positioned about the lift 100, 200. For example, an accelerometer can be used to measure the tilt of the lift 100, 200, while a load pin sensor can be used to measure the current platform 110, 210 loading. An elevation sensor can be used to determine the current platform 110, 210 height. Maximum allowable height may vary, and is calculated using the degree of vehicle tilt currently sensed. Other visual indicators can include a status code, a generator status indicator, and a current drive mode. Fuel or battery level can be indicated on the home screen 308 as well to allow a worker to adequately gauge the amount of operating time remaining for the lift 100, 200.

A ribbon 310 below each indicator provides different selectable inputs 312 on the GUI that can be accessed, for example, using the inputs 158 on the upper enclosure 138 of the control box 130. The inputs 312 can each be assigned different functions, with one being a "select" button, another being a "go back" button, arrows to select different options on the GUI 300, and a "main menu" button. Using the inputs 158, a worker can toggle through various screens on the GUI 300 to obtain information about several different lift 100, 200 operational parameters.

Figure 9:
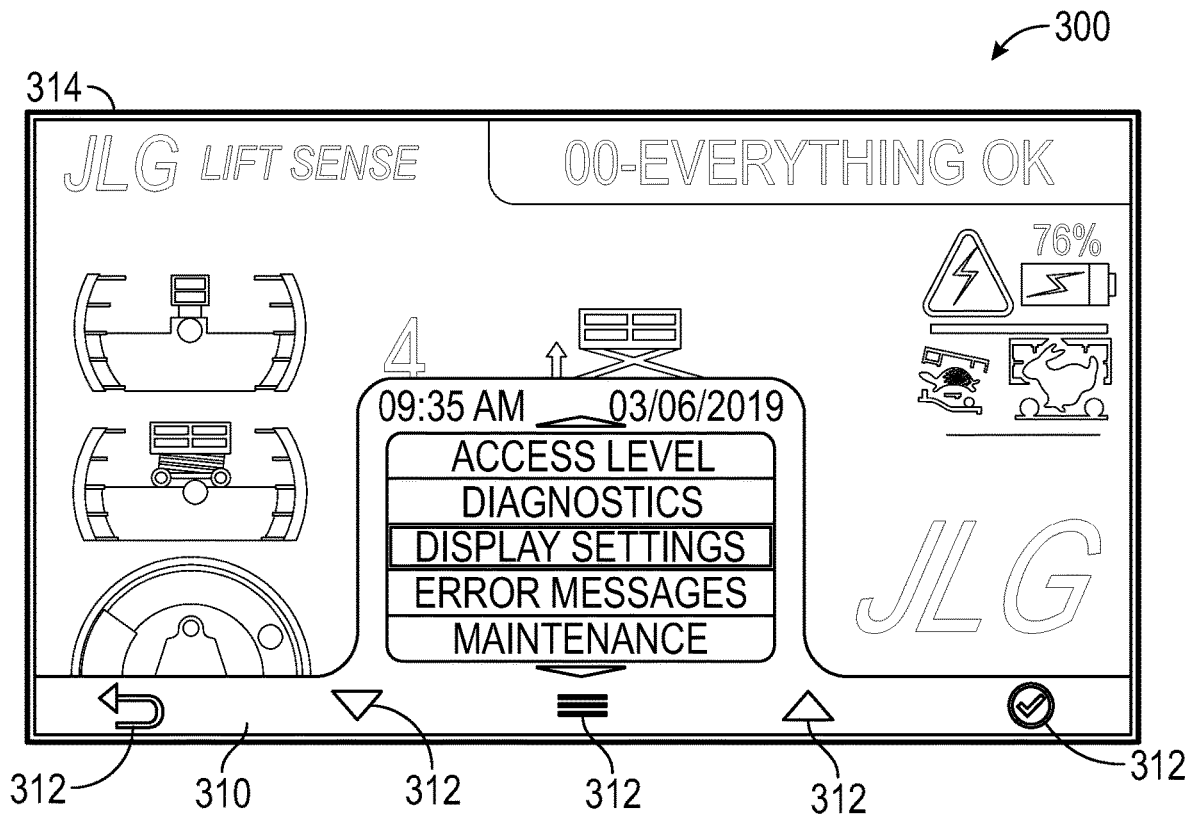
FIG. 9 is a pictorial view of a menu screen within the user interface that can be presented on the display of the control boxes of FIGS. 4A and 5.
Figure 10:
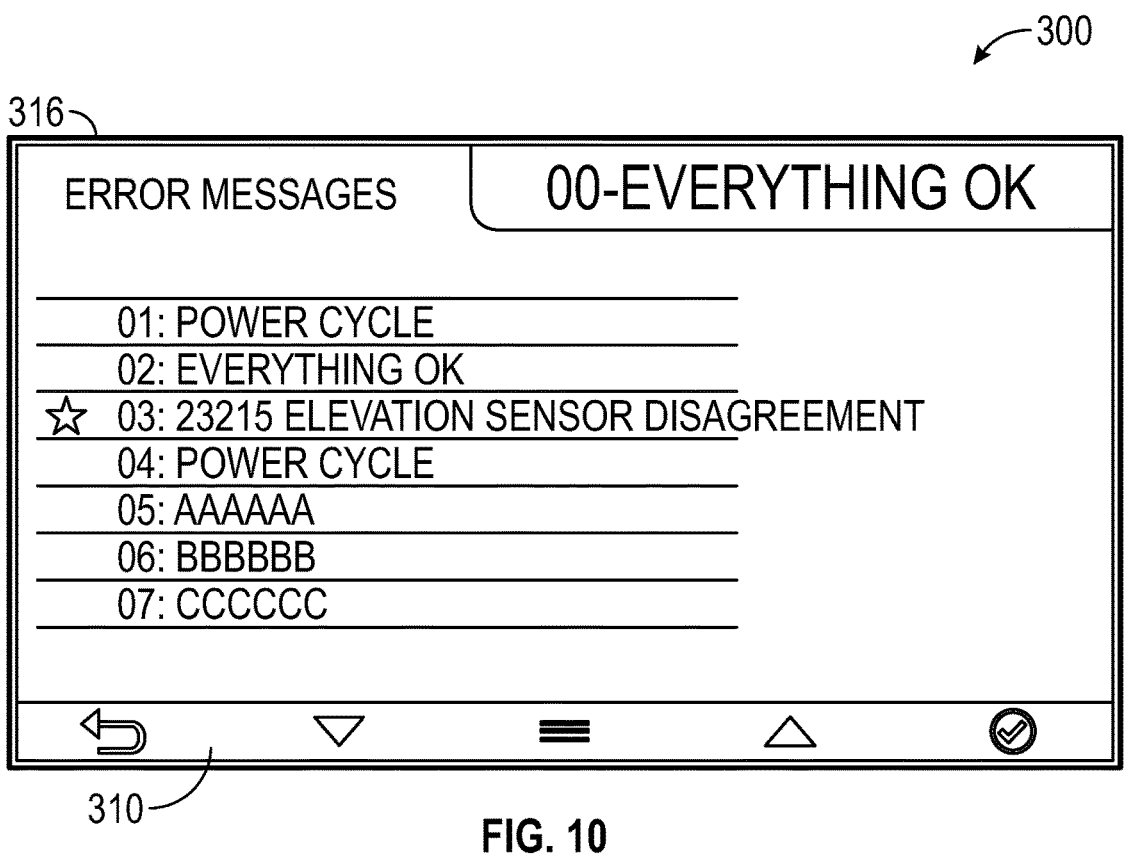
FIG. 10 is a pictorial view of an error messages screen on the user interface that can be presented on the display of the control boxes of FIGS. 4A and 5.
Figure 11:
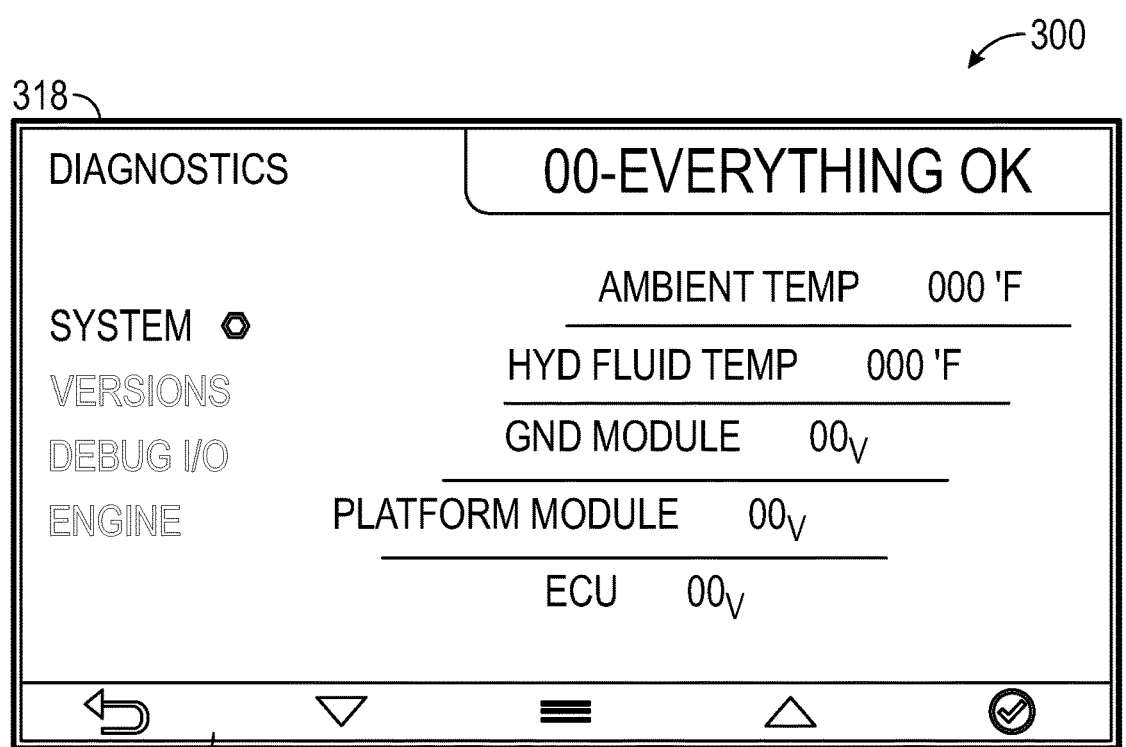
FIG. 11 is a pictorial view of a diagnostics screen on the user interface that can be presented on the display of the control boxes of FIGS. 4A and 5.
Figure 12:
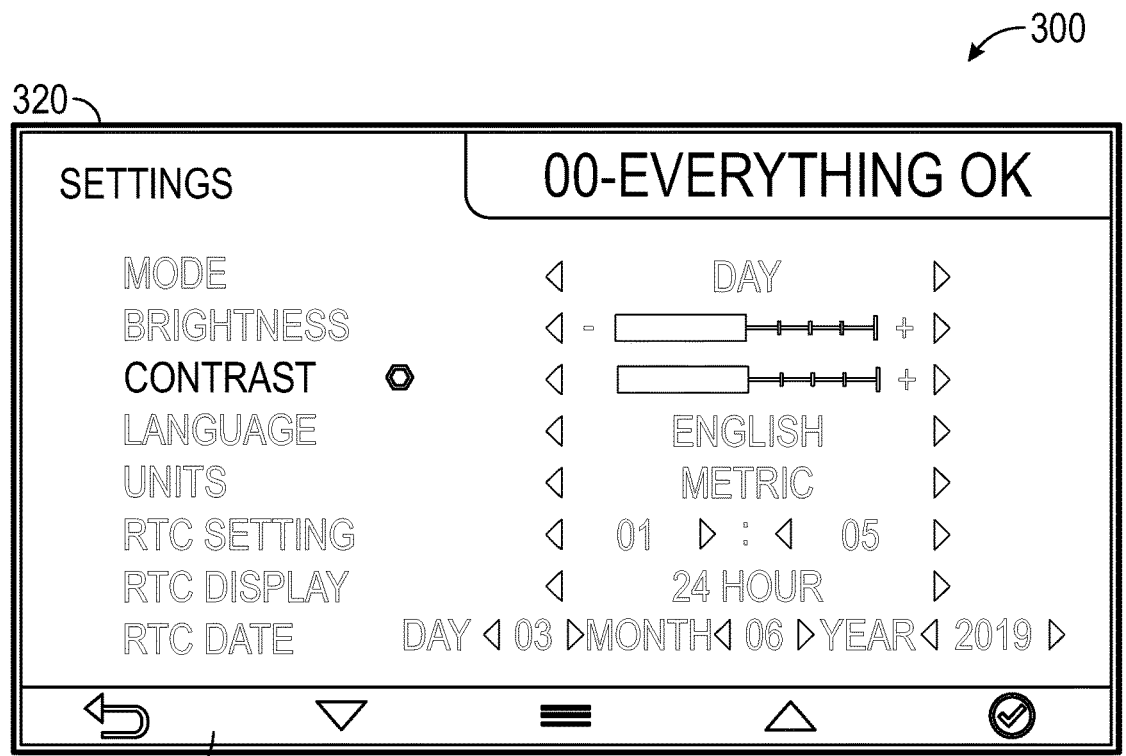
FIG. 12 is a pictorial view of a settings screen on the user interface that can be presented on the display of the control boxes of FIGS. 4A and 5.

Selecting the "main menu" button on the GUI 300 advances the GUI 300 to the menu screen 314, shown in FIG. 9. The available selections can include access level, diagnostics, display settings, error messages, and maintenance, for example. Once again using the inputs 158, a worker can toggle through the menu to select the desired sub-menu on the menu screen 314. If "error message" is selected, the GUI 300 will advance to the screen 316, shown in FIG. 10. The screen 316 can display and provide additional information about an error code that may be present on the home screen 308, including troubleshooting or maintenance options. If "diagnostics" is selected, the GUI 300 will instead advance to the screen 318, shown in FIG. 11. Various system parameters can be displayed, including information relating to the hydraulic fluid, ambient temperature, battery power parameters, or engine-related data. Data presented in the diagnostic screen 318 could be updated in real-time, periodically (e.g., every 15 minutes), or on-demand using sensors positioned throughout the lift 100, 200. Selecting "settings" would advance the GUI 300 to the screen 320, shown in FIG. 12. The settings screen 320 can allow user customization of different display 156, 248 characteristics, like brightness or contrast, as well as information presentation styles, like language, units, and time.

Figure 14:
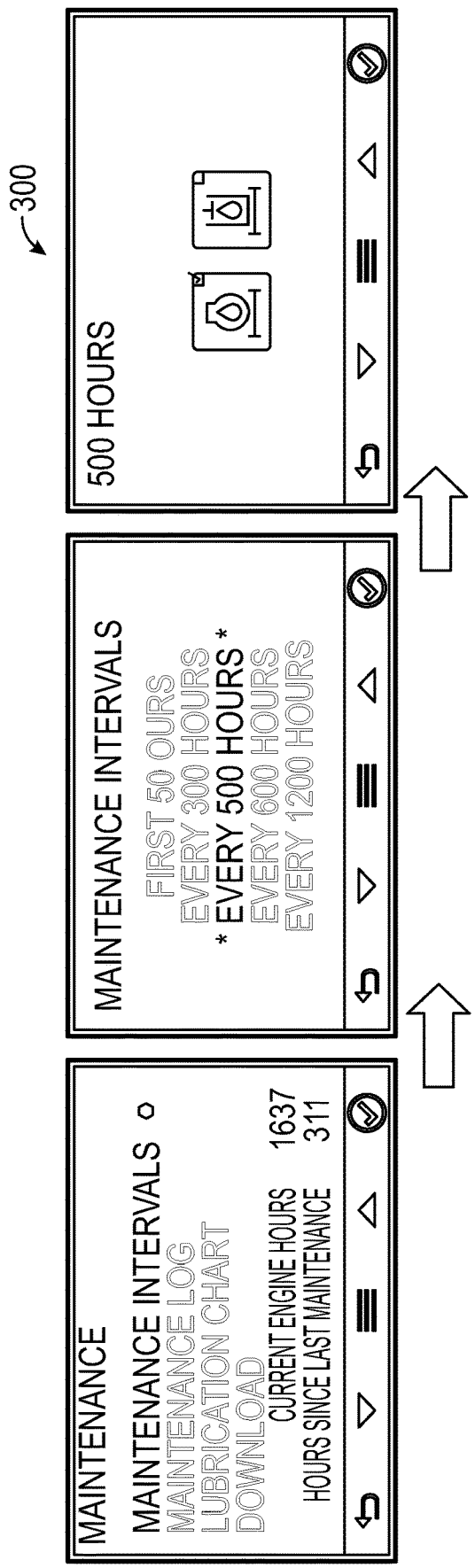
FIG. 14 is a sequential view of maintenance interval graphics within the user interface that can be presented on the display of the control boxes of FIGS. 4A and 5.
Figure 15:
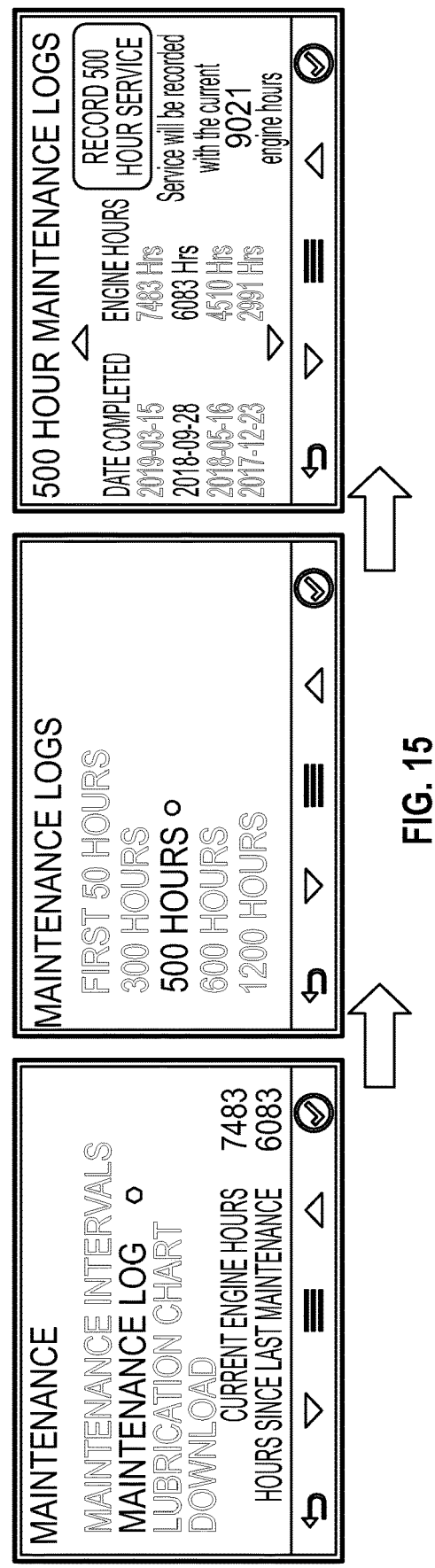
FIG. 15 is a sequential view of maintenance log graphics within the user interface that can be presented on the display of the control boxes of FIGS. 4A and 5.
Figure 16:
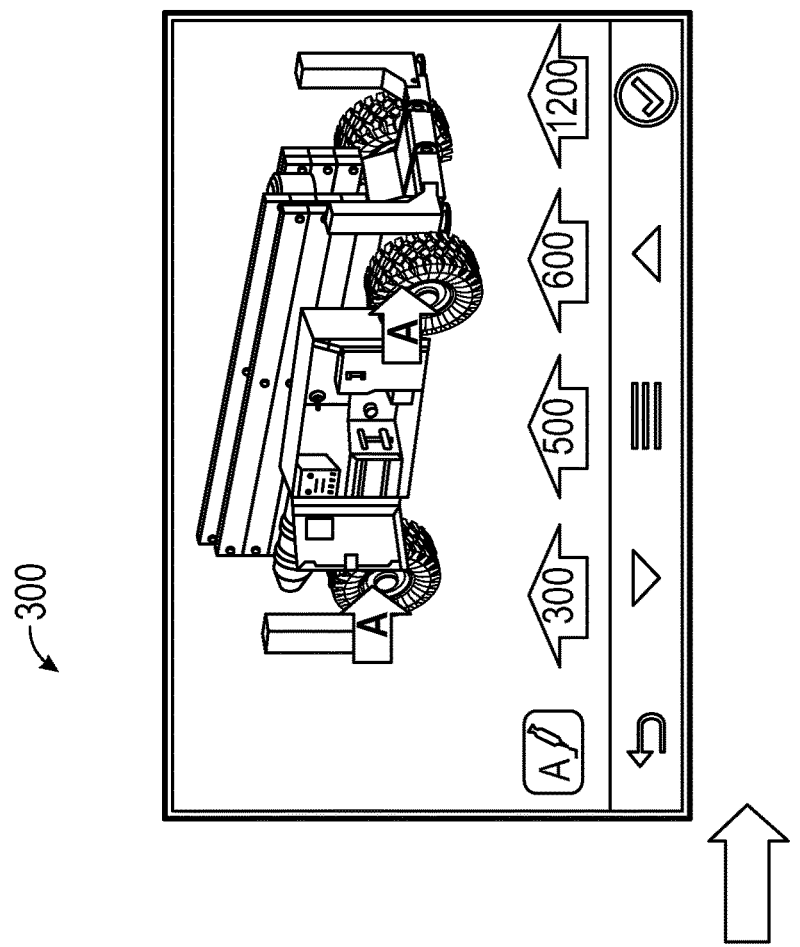
FIG. 16 is a sequential view of lubrication chart graphics within the user interface that can be presented on the display of the control boxes of FIGS. 4A and 5.
Figure 17:
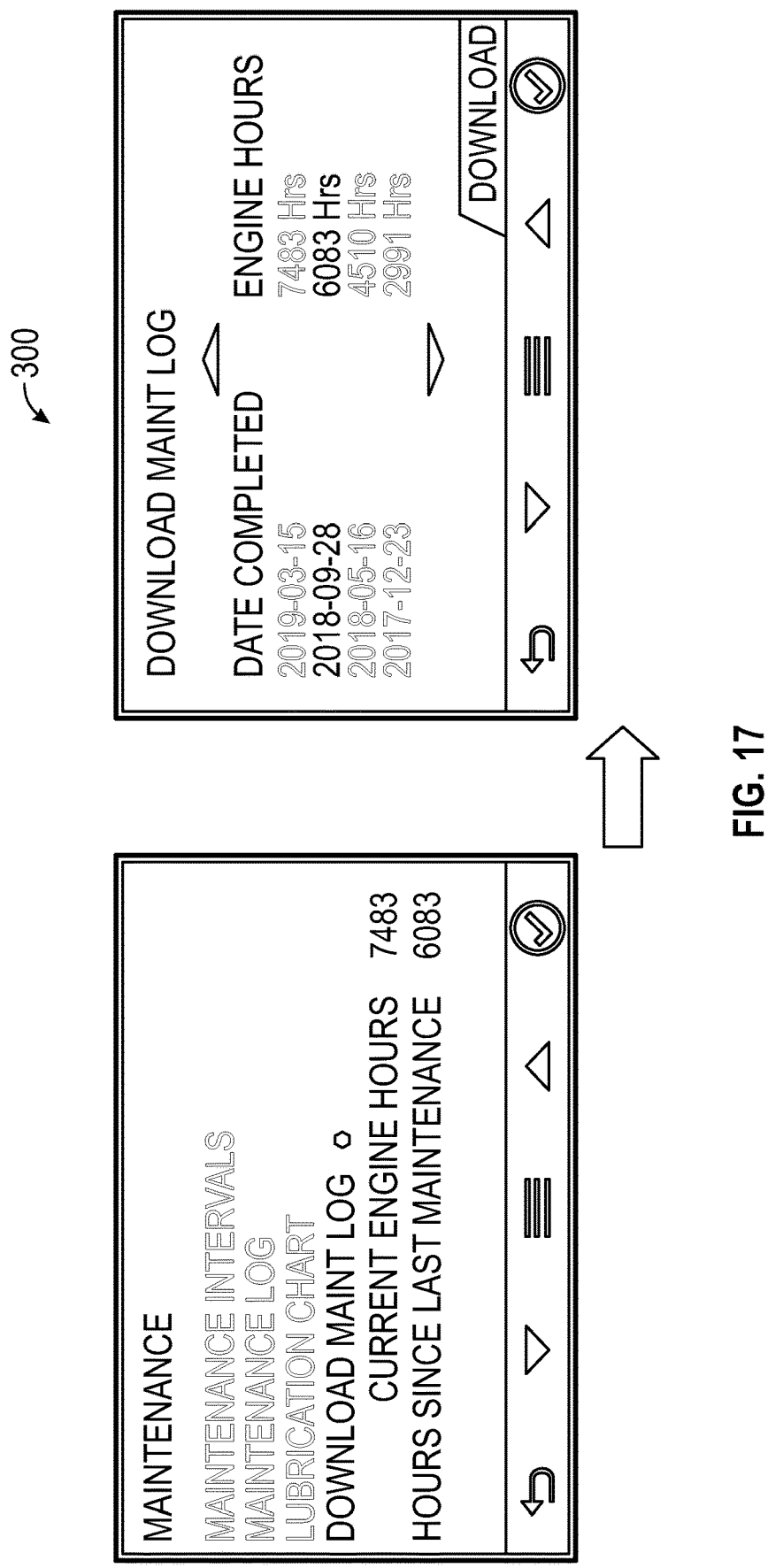
FIG. 17 is a sequential view of downloadable maintenance log graphics within the user interface that can be presented on the display of the control boxes of FIGS. 4A and 5.

Selecting "maintenance" from the menu screen 314 advances the GUI 300 to the maintenance screen 324, shown in FIG. 13. The maintenance screen 324 can include information about maintenance that is currently necessary, maintenance that has been previously performed, proper lubrication charts, or downloadable materials associated with vehicle maintenance that can then be presented on the display 156, 248. As depicted in FIG. 14, a user can select and set maintenance intervals to ensure proper system upkeep is performed. As depicted in FIG. 15, a user can enter or review maintenance logs that detail maintenance performed on the lift 100, 200. FIG. 16 shows a lubrication chart illustrates the various locations and time intervals where lubrication should be applied to the lift 100, 200. Finally, FIG. 17 illustrates downloadable maintenance logs that can be reviewed on the display 156, 248. The maintenance logs can be stored in an on-board memory (e.g., random access memory or other types of programmable memory) or an external memory (e.g., a cloud-based memory or off-site data storage network) that is accessible by a processor in communication with the display 156, 248. Alternatively, the maintenance logs can be downloaded from the display 156, 248 using a USB drive plugged into one of the USB ports on the control box 130, 232. In addition to maintenance logs, maintenance or work instructions (e.g., archived standard operating procedure bulletins) can be accessed using the processor, and then subsequently presented on the display 156, 248.

Figure 18:
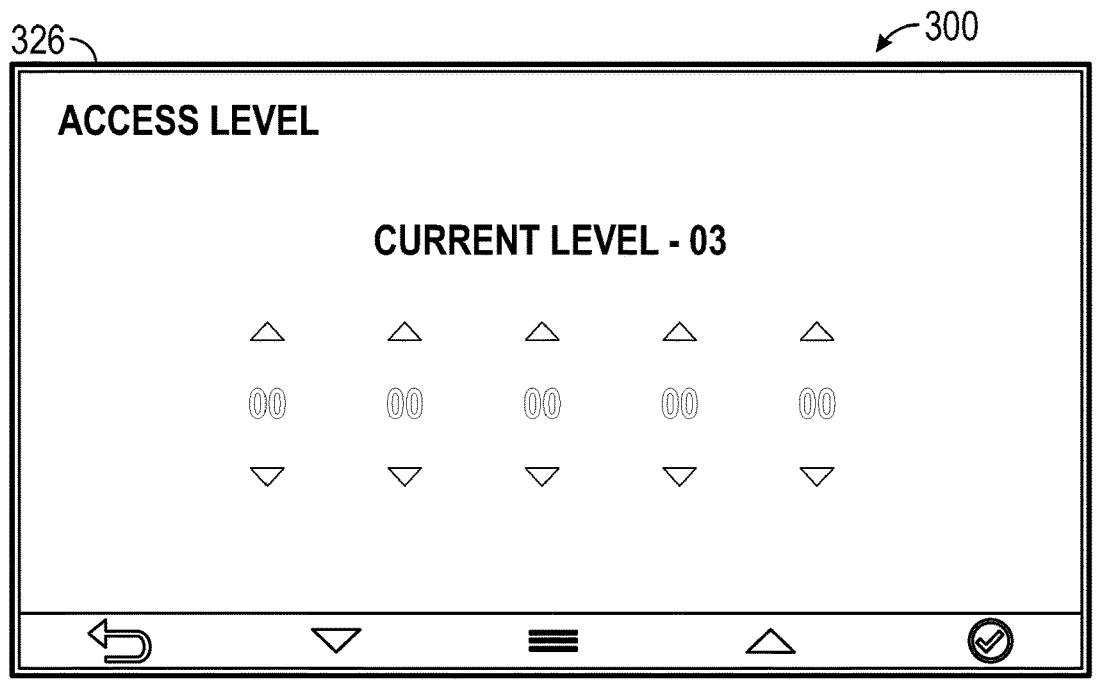
FIG. 18 is a pictorial view of an access screen on the user interface that can be presented on the display of the control boxes of FIGS. 4A and 5.

Selecting "access" will advance to screen 326, shown in FIG. 18, that allows for a service technician to bypass certain security measures in place to perform maintenance or review additional information about the lift 100, 200 that may not normally be accessible to a user. The technician may be provided with a handheld analyzer that can pair with the GUI 300 to download information from the GUI 300 or otherwise interact with the GUI to allow other types of maintenance to be performed. In some embodiments, an app-based analyzer can be used to extract information from the GUI 300.

Figure 19:
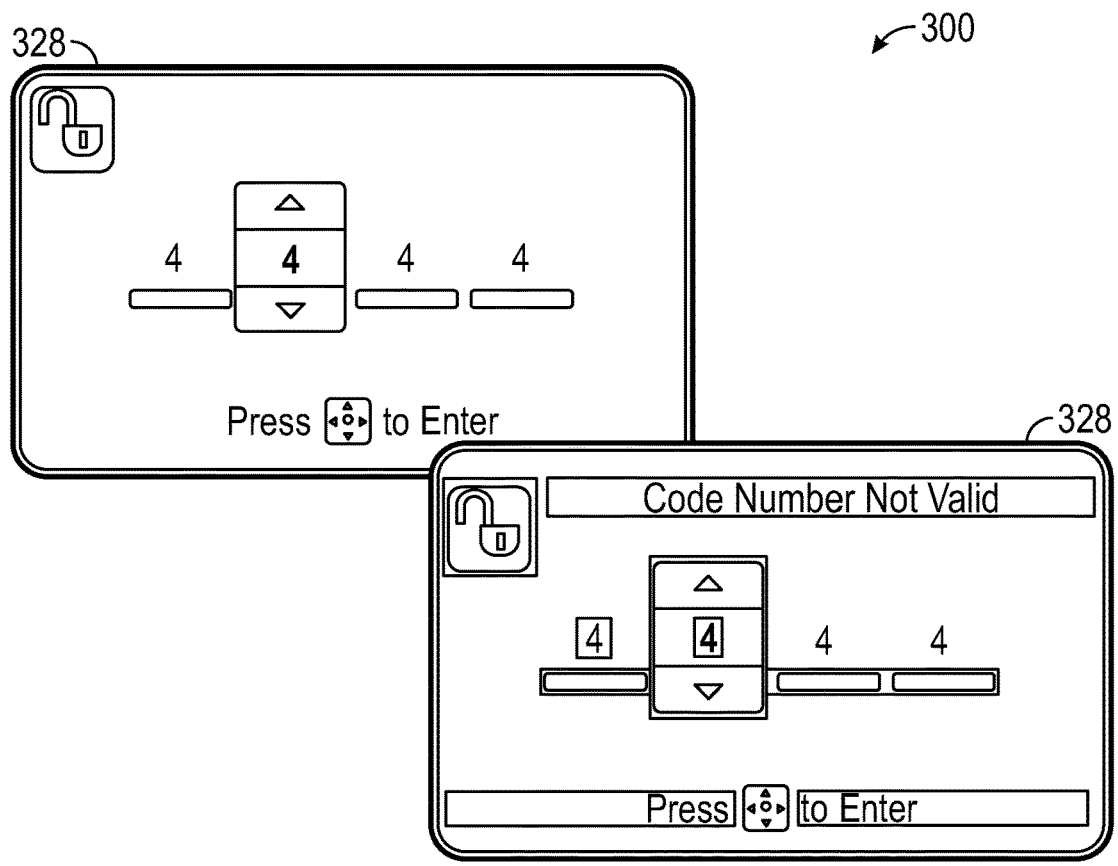
FIG. 19 is a pictorial view of a security screen within the user interface that can be presented on the display of the control boxes of FIGS. 4A and 5.

Different security measures can be put in place to prevent unwanted lift 100, 200 operation, as depicted in FIG. 19. For example, a lock screen 328 can prompt a user to enter a security passcode before the GUI 300 will advance to the home screen 308. Using the inputs 158, a user can enter in a sequence of digits into the GUI 300, which will then determine and allow access to the instructions screen 304, verification screen 306, or home screen 308 if the entered sequence of digits is correct.

Using the described control box 130, 232 and lifts 100, 200, workers on the work platforms 110, 210 can have a better understanding of the machine functionality, which results in reduced service calls and improved troubleshooting that may otherwise lead to extended machine downtime. The control boxes 130, 232 and displays 156, 248 are cross-compatible with different types of lifts (e.g., scissor lifts, telescopic boom lifts, articulating boom lifts) and different types of power sources (e.g., battery powered or gasoline powered) without significant modification. Operators on the platform 110, 210 will better understand the operating conditions and capabilities of the lifts 100, 200 being operated, which further promotes efficient and effective operation.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the platform control box as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A control box for a work platform, comprising:
a housing defined by a first side panel and a second side panel opposing the first side panel, the first side panel and second side panel partially surrounding and extending from a lower enclosure to an upper enclosure spaced apart from the lower enclosure, at least one of the upper enclosure and the lower enclosure supporting a control panel having a plurality of inputs, at least one of the inputs being a platform positioning mechanism in communication with a lift system configured to move the work platform vertically between a stowed position and a deployed position;
a display supported by the housing and in communication with at least one of the plurality of inputs, the display being configured to receive and present output obtained by a sensor monitoring a parameter of the work platform; and
a roof extending between the first side panel and the second side panel and above the upper enclosure, wherein a protective cover is rotatably coupled to the roof and suspended downward from the roof, forward of the display;
wherein the sensor is one of a platform load measuring sensor, a platform tilt measuring sensor, and a platform elevation sensor;
wherein the control panel is a first control panel supported by the lower enclosure, at least one of the inputs on the first control panel being an ignition switch configured to communicate with a main battery positioned externally from the work platform; and
wherein the control box further comprises a second control panel supported by the upper enclosure, the upper enclosure supporting a second plurality of inputs and the display, at least one of the second plurality of inputs being configured to interact with the display.

2. The control box of claim 1, wherein the lower enclosure houses a secondary battery, the secondary battery providing electrical power to each of the first control panel and the second control panel.

3. The control box of claim 2, wherein the secondary battery is in selective communication with a motor positioned externally from the work platform, the secondary battery configured to execute a backup ignition sequence.

4. The control box of claim 1, wherein the display is configured to present a graphical user interface at a brightness in excess of 800 nits.

5. The control box of claim 1, wherein the display is configured to present a graphical user interface, the graphical user interface including a series of menus that can be selected using the plurality of inputs on the first control panel.

6. The control box of claim 1, wherein the platform positioning mechanism is a joystick that extends away from a top surface of the lower enclosure and includes at least one input in communication with the lift system and configured to send a command to the lift system to adjust a vertical position of the work platform.

7. The control box of claim 6, wherein the joystick is pivotable relative to the lower enclosure, the joystick being in communication with a motor and chassis each positioned externally from the work platform, the motor and chassis each being configured to adjust operational parameters in response to receiving an indication of an orientation of the joystick relative to the lower enclosure.

8. The control box of claim 7, wherein the control box is configured such that operation of the lift system is disabled when an operational parameter of the motor and chassis is being adjusted.

9. The control box of claim 8, wherein the control box is configured such that operational parameters of the motor and chassis are maintained, independent of the orientation of the joystick relative to the lower enclosure, when the lift system is operating to adjust a vertical position of the work platform.

10. The control box of claim 1, wherein the lower enclosure includes at least one externally-accessible USB charge port in electrical communication with one of a primary battery positioned externally from the work platform or a secondary battery positioned within the lower enclosure.

* * * * *